United States Patent Office 3,716,480
Patented Feb. 13, 1973

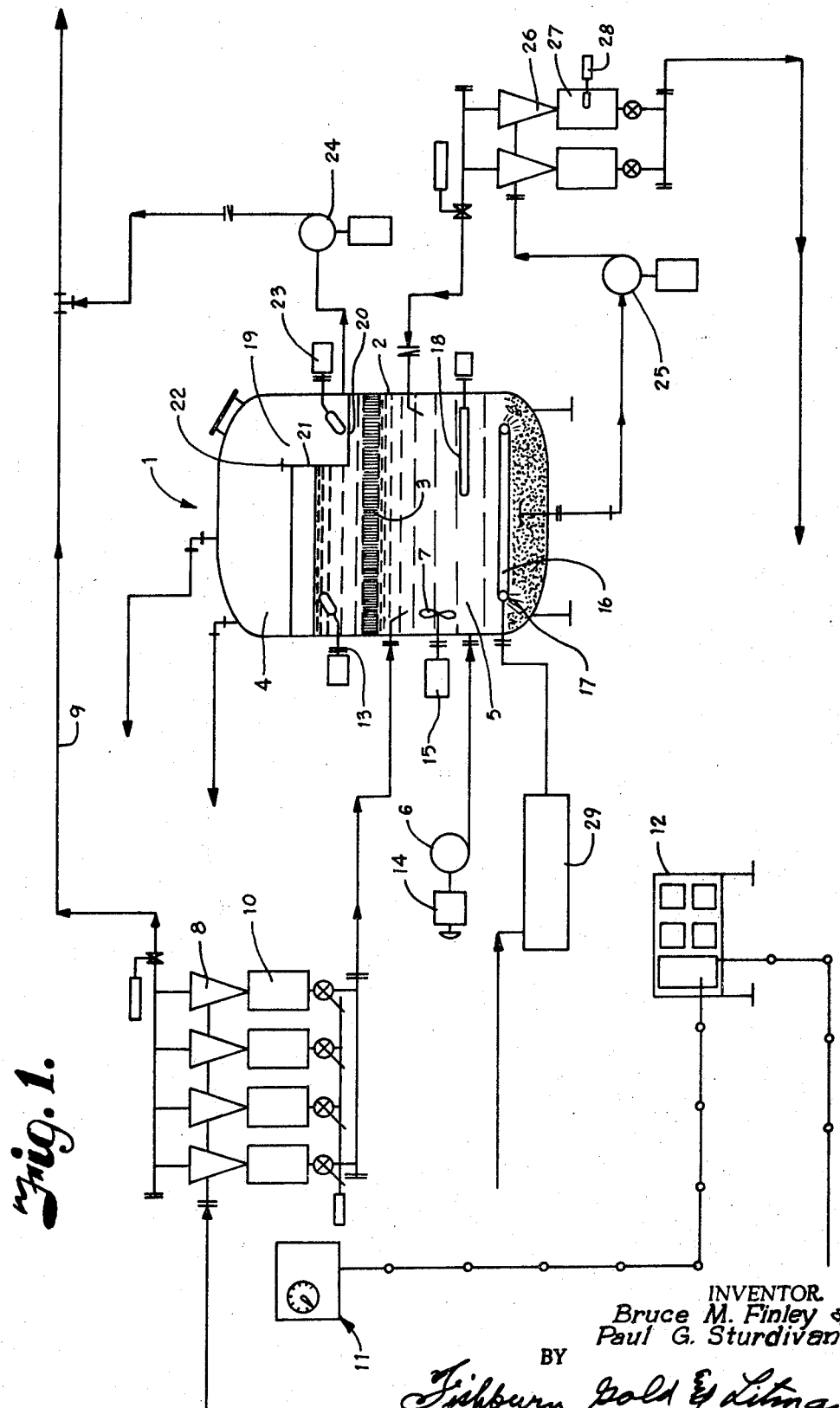

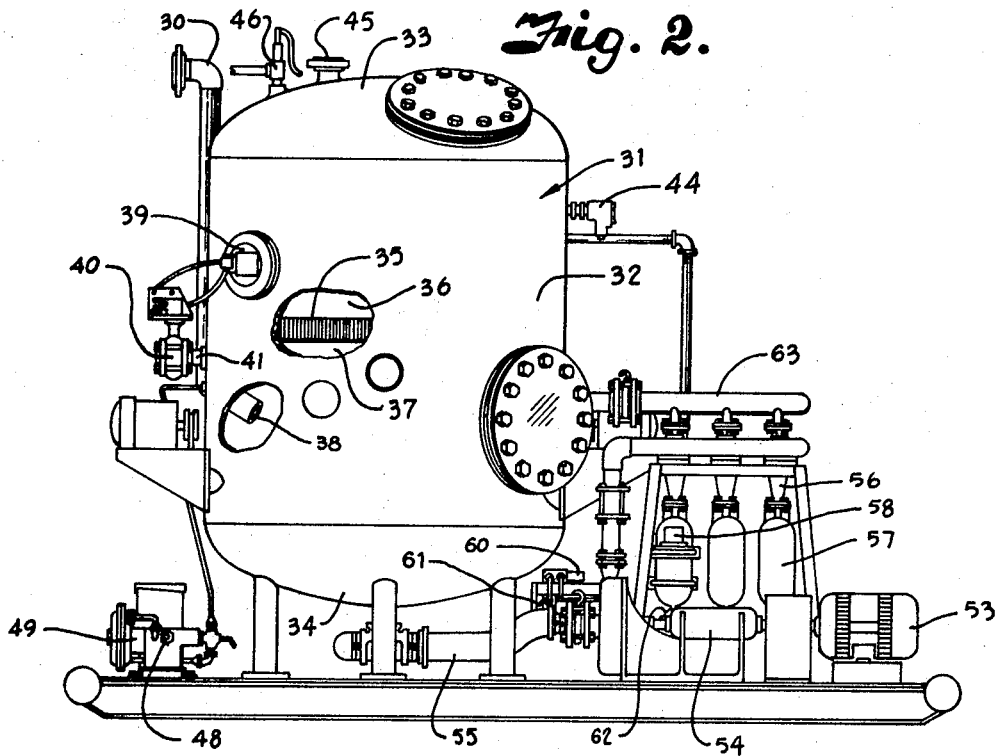
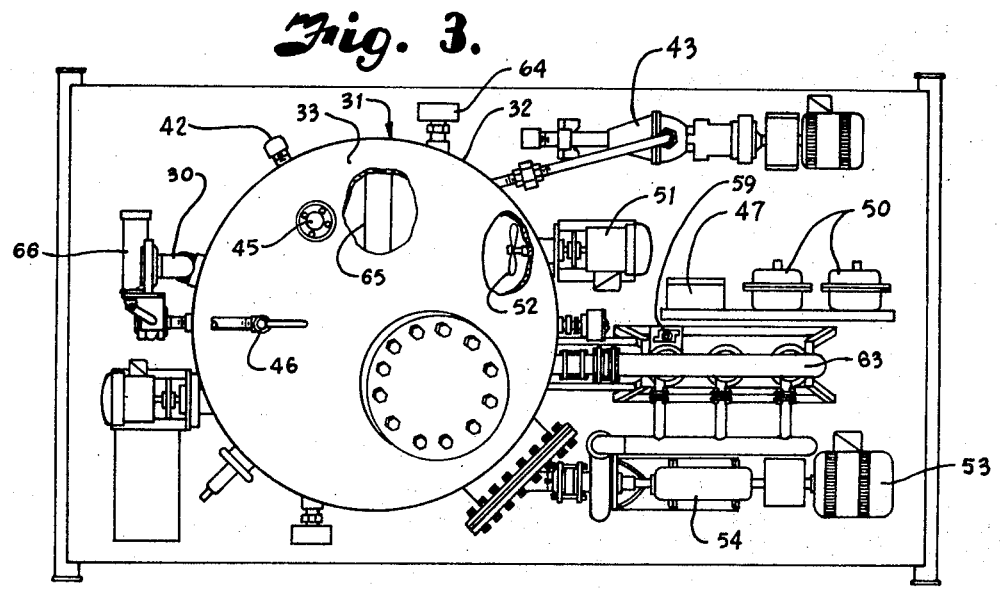

3,716,480
METHOD AND APPARATUS FOR CLEANING SOLIDS COATED WITH OIL
Bruce M. Finley and Paul G. Sturdivan, Oklahoma City, Okla., assignors to Demco Incorporated, Oklahoma City, Okla.
Filed June 21, 1971, Ser. No. 154,803
Int. Cl. B01d 17/02
U.S. Cl. 210—22                                          15 Claims

ABSTRACT OF THE DISCLOSURE

A method and apparatus for cleaning solids coated with oil and removing oil therefrom is disclosed and includes a solids clarifier tank having a selected liquid therein and for receiving a portion of oil well production comprising a mixture of oil and solids coated with oil and having a baffle positioned therein to divide the clarifier tank into upper and lower chambers and a pump operative to inject a surfactant into the mixture of oil and solids coated with oil and the selected liquid which is mixed by agitation or mixing blades to disburse the surfactant throughout the mixture to effect rising of the oil which is removed from the upper chamber and settling of the solids which are removed from a lower portion of the lower chamber as a solids-liquid slurry which is separated into a solids portion to be discharged for disposal and a liquid portion which is returned to the clarifier tank.

---

The present invention relates to processing of oil well production containing solids coated with oil for removing the oil therefrom and discharging or disposing of the cleaned solids.

Particularly when offshore oil well production includes sand and other solids coated with oil, a disposal problem is presented. The oil coated solids cannot be dumped overboard into the ocean or any other body of water because of regulations against pollution. The portion of the oil well production containing the oil coated solids must either be transferred ashore with the oil coated solids therein which damages pumps, meters and other equipment, or the oil coated solids must be removed at the platform and taken ashore in suitable barges and unloaded inland which is expensive and requires considerable land area for disposal of the solids coated with oil.

The principal objects of the present invention are: to provide a method and apparatus for removing an oil coating from solids of oil well production and discharging or disposing of clean solids at the platform and flowing the removed oil into a pipeline for delivery with an oil portion of the oil well production to suitable storage or processing facilities; to provide such a method and apparatus for cleaning solids coated with oil which is operative to maintain the cleaned solids in suspension for removal as a solids-liquid slurry to then be separated into clean solids and liquid portions; to provide such a method and apparatus for cleaning solids coated with oil which is substantially automatic and requires a minimum of supervision of the operation thereof, including only periodic addition of chemical to be used in the apparatus; to provide such a method and apparatus for cleaning solids coated with oil which is operative to agitate a mixture of oil and solids coated with oil and a selected liquid to disperse a selected chemical throughout the mixture to effect separation of the oil coating from the solids; to provide such an apparatus and method for cleaning solids coated with oil including a baffle positioned within a clarifier container or tank and operative to form a quiescent zone and an agitated zone in the clarifier container or tank having the mixture therein; to provide such a method and apparatus as for cleaning solids coated with oil having a level control operative to maintain an upper surface of liquids including oil and a selected liquid at a selected level for removal of oil therefrom; to provide such a method and apparatus for cleaning solids coated with oil operative to remove and centrifugally separate a slurry formed of the settled solids maintained in suspension in the liquid within the agitated zone of the container into a cleaned solids portion for disposal and a liquid portion for return to the clarifier tank; and to provide such a method and apparatus for cleaning solids coated with oil which is easily maintained, positive in operation, simple in operation, and particularly well adapted for the proposed use.

Other objects and advantages of this invention will become apparent from the following description taken in connection with the accompanying drawings wherein are set forth by way of illustration and example, certain embodiments of this invention.

The drawings constitute a part of this specification and include exemplary embodiments illustrating various objects and features of the method and apparatus for cleaning solids coated with oil and removing the oil therefrom to permit disposal of the cleaned solids.

FIG. 1 is a schematic flow diagram illustrating operating components for processing a portion of oil well production to clean solids coated with oil and embodying features of the present invention.

FIG. 2 is a side elevational view of a modified apparatus for cleaning solids coated with oil and removing oil therefrom.

FIG. 3 is a plan view of the modified apparatus shown in FIG. 2.

Referring more in detail to the drawings:

As required, detailed embodiments of the invention are disclosed herein, however, it is to be understood that the disclosed embodiments are merely exemplary of the invention which may be embodied in various forms that are different from those illustrative embodiments presented herein. Therefore, specific structural and functional details disclosed herein are not to be interpreted as limiting, but merely as a basis for the claims actually defining the scope of this invention. In this regard, it is to be recognized that the apparatus for cleaning solids coated with oil, in accordance herewith, may be embodied in various forms and the method may be accomplished with various apparatus and, furthermore, that such method and apparatus may be variously controlled as for continuous or batch operations. The disclosure hereof is presented only as a representative basis for teaching one skilled in the art to variously employ the present invention in virtually any appropriate detailed structure.

In the disclosed embodiment of the present invention, the reference numeral 1 generally designates a solids clarifier operative to treat a portion of oil well production containing solids coated with oil to clean the solids by removing the oil coating therefrom to thereby prepare the solids for the disposal as required by various regulations against pollution. The solids clarifier 1 includes a tank 2 having a selected liquid therein which is heavier than oil, such as fresh water, brackish water, or salt water, and is adapted to receive a portion of oil well production comprising a mixture of fluids and oil and solids coated with oil. The tank 2 has a baffle 3 positioned therein to divide the tank 2 into an upper chamber 4 and a lower chamber 5. A pump 6 is operative to inject a soluble chemical surfactant into the lower chamber 5 of the tank 2 and the mixture of oil and solids coated with oil and the selected liquid therein which is mixed by agitation blades 7 within the lower chamber 5 to disburse the surfactant throughout the mixture to thereby effect rising of the oil and the oil of the coating of the solids through the selected liquid and into the upper chamber 4 for removal therefrom and the settling of the solids into a lower portion of the lower chamber 5 for removal therefrom as a solids-liquid slurry which is then separated into a solids portion which is discharged for disposal and a liquid portion which is returned to the tank 2, as later described.

In the schematic flow diagram illustrated in the FIG. 1, oil well production containing a substantial portion of entrained solids coated with oil flows into at least one separator container 8 which is operative to centrifugally separate oil and solids coated with oil. The cleaned or solids free oil flows from the separator container 8 into an overflow header 9 for flow to storage or process facilities (not shown). Rejected solids accumulate within a second or storage container 10 spaced from the separator container 8 and positioned to receive the separated solids coated with oil portion of the oil well production for storage of same therein.

The stored solids coated with oil are periodically purged from the storage container 10 on signal from suitable control means 11 preferably including a cycle timer within a time controller. As each dump cycle is initiated, an electrical impulse is transmitted to a main control box 12 having circuits and means therein operative to initiate an adjustable wash cycle for flushing the solids coated with oil from the second or storage container 10 for delivery as a mixture of fluids and oil and solids coated with oil to the tank 2.

The oil and solids coated with oil enter the tank 2 which is partially filled with a quantity of a selected liquid which is heavier than oil, such as fresh water, salt water, brackish water, or the like, to minimum level which is maintained above the baffle 3 by a flow controlled make-up water switch 13.

Chemical injection means communicate with the tank 2 and are operative for injecting a selected chemical in the form of a soluble surfactant into the lower chamber 5 and the mixture of the selected liquid and the fluids and solids coated with oil therein. In the disclosed embodiment a suitable pump 6 is operative to deliver the surfactant to the lower chamber 5 upon signal from the control means 11.

Agitation means positioned within the lower chamber 5 are operative to thoroughly disperse the surfactant throughout the mixture of the selected liquid and the fluid and solids coated with oil to effect separation of the oil coating from the solids and settling of the solids and rising of the oil portions of the liquids of the mixture into the upper chamber 4. The illustrated agitation means include a plurality of spaced mixing blades 7 positioned within the lower chamber 5 and suitable power means, such as motors 15, are operatively connected to each of the respective mixing blades 7 for selectively driving same upon signal from the control means 11.

It is desirable to maintain the settled solids in suspension in the selected liquid to form a solids-liquid slurry for removal, as later described, therefore, an elongated tubular member 16 is positioned in a lower portion of the lower chamber 5 and has a plurality of apertures 17 spaced therealong and suitable means are operatively connected to the tubular member 16 for effecting a flow of gas or air through the apertures 17 and into the mixture of the selected liquid and the fluids and solids coated with oil to maintain the solids in suspension. It is preferable that the mixing blades 7 be driven simultaneously with the flow of gas through the apertures 17 in the tubular member 16 and the operation of the pump 14 to effect a thorough dispersion of the surfactant throughout the mixture within the lower chamber 5.

It has been found that heating the mixture of the selected liquid and the fluid and oil and solids coated with oil accelerates the reaction of the surfactant with the oil coating of the solids particularly when the temperature of the mixture is maintained within a selected range; therefore, a plurality of spaced immersion type heaters 18 are positioned within the lower chamber 5 to thereby accelerate the chemical reaction of the surfactant with the oil coating of the solids coated with oil to thereby separate the oil therefrom.

The baffle 3 is effective to maintain the liquids in the upper chamber 4 in a substantially quiescent condition during agitation of the mixture within the lower chamber 5. The baffle 3 is preferably formed of a stainless steel wire woven into a tight mass having a diameter equal to the inside dimension of the tank 2 and a thickness in the range of three to five inches (3" to 5") thereby restricting the mixing action to the lower chamber 5 below the baffle 3 with the liquids above the baffle 3 remaining quiescent particularly at the upper surface thereof.

After the surfactant has been thoroughly mixed with the liquid and oil and solids coated with oil, the mixture is maintained in a quiescent condition by discontinuing operation of the pump 14, mixing blades 7, and flow of gas or air through the apertures 17 of the tubular member 16 thereby allowing oil droplets to ascend upwardly through the liquid and through the baffle 3 to form an oil phase on an upper surface of the liquid within the upper chamber 4 whereby the oil is suitably removed therefrom.

A collection compartment 19 is positioned within the upper chamber 4 to receive oil from the upper surface of the liquid within the upper chamber 4 and has a bottom wall 20 spaced above the baffle 3 and a side wall 21 extending upwardly from peripheral edges of the bottom wall 20. A weir section 22 having suitable weir notches in an upper edge thereof is positioned on an upper edge of at least a portion of the side wall 21 to permit flow of the oil from the upper chamber 4 into the collection compartment 19 where means in communication with the collection compartment and responsive to level of oil therein are operative to effect removal of the oil therefrom.

The illustrated oil removing means include a float controlled switched 23 operative to activate a motor driven transfer pump 24 to remove oil from the collection compartment 19 and force the reclaimed oil under pressure into the overflow header 9 or other suitable conduit for flow to suitable treatment or process or storage facilities (not shown).

After the retention period, wherein the oil portion of the mixture rises to the upper surface of the liquid within the upper chamber 4 and the solids having the oil coating removed therefrom settle to the lower portion of the lower chamber 5. A suitable centrifugal pump 25 is activated on signal from the control means 11 to remove a slurry formed of the settled and cleaned solids and the selected liquid from the container or tank 2. It is preferable to maintain the cleaned solids in suspension in the lower portion of the lower chamber 5 for ease in removal, therefore, gas or air is exhausted through the apertures 17 of the tubular member 16 into the cleaned solids and liquid.

The slurry flows into one or more separator containers 26 adapted for receiving the solids-liquid slurry and which have means therein operative to centrifugally separate a solids portion from a liquid portion of the slurry. One or more storage containers or accumulators 27 are positioned to receive the separated solids portion of the solids-liquid slurry from the separator container or containers 26 for storage of same therein. Means in communication with the separator container or containers 26 are operative, on signal from the control means 11, to effect return of the separated liquid portion of the solids-liquid slurry to the tank 2 for reuse therein and for maintaining a selected liquid level in the upper chamber 4.

Volume detection means 28 are operative to produce a signal in response to accumulaton of a selected volume of cleaned solids in the storage containers or accumulators 27 which effects purging of the storage containers or accumulators 27 of the cleaned solids. The storage containers or accumulators 27 may also be periodically purged of the cleaned solids for disposal on signal from the control means 11. After the purging of the storage containers or accumulators 27, the main control box 27 has circuits therein operative to reset the timing mechanism until the next wash cycle is signaled.

The chemical pump 6 may be powered or driven by any suitable means and the means for effecting flow of the separated liquid portion of the slurry from the separator containers 26 may be accomplished with any suitable means, however, in the illustrated embodiment, an air volume tank 29 is employed for supplying a suitable gas or air to the tubular member 16 and for operation of several pneumatic cylinders and the chemical pump 6.

Sequences in the wash cycle are adjustable for length of duration and may be manually activated by suitable overriding control switches, motors, starters, solenoids and other electrical equipment which are preferably contained in an explosion-proof environment and have special external non-corrosive coatings. The first separator container 8 requires a pressure differential of 35 to 50 pounds per square inch depending on the fluid viscosity for effecting removal of solids of 10 to 30 microns and larger. In the event that the oil well production system is unable to accomplish a head loss of 35 to 50 pounds per square inch, a suitable centrifugal pump (not shown) designed to deliver the volume and pressure required may be installed upstream of the separator container 8.

Particularly on offshore production platforms the separator container 8 may be located directly above the tank 2 to thereby economize on valuable deck area. The solids clarifier 1 preferably operates on a one-hour wash cycle and is designed to process 50 to 100 barrels of solids coated with oil per day with a tank 2 having a size of 5 feet diameter and 5 feet height. The size of the tank 2 may be varied as desired to process the required amount of solids coated with oil.

FIGS. 2 and 3 illustrate a modified embodiment of an apparatus operative to treat a portion of oil well production having a quantity of solids coated with oil to clean the solids by removing the oil coating therefrom. A suitable conduit 30 receives a mixture of fluids and solids coated with oil for delivery thereof to a clarifier tank 31 having a side wall 32 and upper and lower end walls 33 and 34 respectively preferably dished to form an enclosed container. A baffle 35 is mounted within the tank 31 and is positioned intermediate the upper and lower end walls 33 and 34 to define an upper chamber 36 between the baffle 35 and the upper end wall 33 and a lower chamber 37 between the baffle 35 and the lower end wall 34.

A quantity of a selected liquid which is heavier than oil is maintained within the tank 31 wherein flow of the portion of the oil well production having solids coated with oil enters the lower chamber 37 through a discharge end 38 of the conduit 30 and is mixed with the selected liquid therein. The selected liquid within the clarifier tank 31 is maintained at a minimum level above the baffle 35 by a float controlled make-up water switch 39. In the illustrated structure, a suitable float is positioned within the upper chamber 36 and is operative to activate the switch 39 when an upper surface of the liquid within the upper chamber 36 is below a predetermined level. The switch 39 is operative to activate a suitable control valve 40 and open same to permit flow of make-up water through a suitable conduit 41 and into the lower chamber 37. In the illustrated structure, the control valve 40 is activated by pneumatic means, as later described.

In the event that there is an excess of fluid or liquid within the upper chamber 36, it is necessary to provide means for removal of same, therefore, a gravity flow line 42 communicates with the upper chamber 36 and extends through the side wall 32 for overflow of excess fluid therefrom. Excess fluid or liquid may also be removed from the upper chamber 36 by a suitable fluid transfer pump 43 which is activated by a suitable probe 44.

Oil well production commonly contains gas, therefore, it is necessary to exhaust at least a portion of gas present within the clarifier tank 31 to prevent an increase of pressure within the clarifier tank 31 and in the illustrated structure, a suitable gas escape line or conduit 45 permits flow of gas therethrough and from the upper chamber 36 for suitable disposal, such as flaring. Pressure within the clarifier tank 31 is controlled by a suitable relief valve 46 mounted on the upper end wall 33 of the clarifier tank 31 and operative to open when the pressure therein exceeds a selected value to permit flow of gas therefrom until the pressure has reduced below the selected value.

The operation of the clarifier tank 31 is preferably automatic and in the illustrated embodiment, a control box 47 contains a suitable reset electrical timer (not shown) having a plurality of adjustable circuits operative to perform a plurality of separate functions. The electric timer and the circuits within the control box 47 are preferably synchronized with the entry of the solids-laden fluid to commence the clarifying cycle in a predetermined and adjustable sequence.

The first operation of the clarifying cycle is energizing a suitable solenoid valve 48 for actuation of a chemical injection pump 49 which is operative to inject a soluble surfactant into the lower chamber 37 for mixing with the liquid and fluids and solids coated with oil therein. In the illustrated embodiment, the solenoid valve 48 is operative to allow gas or air to flow to the injection pump 49 which is operative to maintain same in operation for a period of two to five minutes thereby forcing a water-based emulsifying and degreaser chemical into the lower chamber 37 of the clarifier tank 31. The solenoid valve 48 is de-energized when the first circuit times out thereby causing the solenoid valve 48 to reverse and cut off the supply of air or gas to the chemical injection pump 49.

The second operation is energized by a second circuit in the control box 47 and is operative to energize one or more starters 50 which control suitable motors 51 operative to drive respective spaced mixing blades 52 within the lower chamber 37. The mixing blades 52 are operative to disperse the chemical surfactant throughout the mixture of the selected liquid and the fluids and solids coated with oil within the lower chamber 37 to thereby effect settling of the solids and rising of liquids of the mixture into the upper chamber 36. The mixing blades 52 are preferably operated for a period of from five to ten minutes. The baffle 35 tends to restrict the agitation to the lower chamber 37 below the baffle 35 thereby allowing the liquid within the upper chamber 36 to remain substantially quiescent.

Following the mixing or agitation phase, the mixture within the lower chamber 37 is allowed to become and remain substantially quiescent for a period of fifteen to twenty minutes when the liquid is not in motion thereby permitting the chemical surfactant to react with the oil coating of the solids coated with oil to thereby remove the oil therefrom. The oil droplets on being freed from the solids rise upwardly through the heavier salt or fresh water and through the baffle 35 to form an oil phase or film on an upper surface of the liquid within the upper chamber 36. The oil is then removed through the gravity flow line 42 or by means of operation of the fluid transfer pump 43 upon activation by the probe 44. The selected chemical surfactant preferably includes an emulsifying agent which reduces the fluid turbidity within the lower chamber 37.

Following the retention period, a suitable circuit within the control box 47 is operative to energize a suitable starter for a motor 53 which is operative to drive a centrifugal pump 54 positioned in a suction conduit 55 having one end communicating with the lower end wall 34 of the clarifier tank 31 to thereby remove the solids from the lower portion of the clarifier tank 31 in the form of a solids-liquid slurry.

The solids-liquid slurry is deposited in one or more separator containers 56 which have means therein operative to centrifugally separate the solids portion from the liquid portion of the slurry.

The removed solids accumulate within one or more accumulators or storage containers 57 spaced from respective separators 56 and positioned to receive the separated solids-portion of the solids-liquid slurry.

At least one of the accumulators or storage containers 57 has means responsive to volume of cleaned solids therein and operative to discharge the solids from the accumulators or storage container 57 for disposal. In the illustrated structure, the volume responsive means includes a source of radiation directed toward one of the storage containers or accumulators 57 illustrated as a container 58 having a suitable quantity of radium therein. The radium container 58 is positioned on one side of the accumulators or storage containers 57 and a radiation counting device 59 is positioned on an opposite side of the respective accumulator or storage container 57. Gamma rays from the radium container 58 are continuously received by the radiation counting device 59 until the volume of the solids within the respective accumulator or storage container 57 reaches a level therein sufficient to absorb the gamma rays thereby activating a suitable control relay for effecting discharging of the solids portion of the slurry for disposal.

In the illustrated structure, a solenoid valve 60 is energized by the suitable control relay activated by the radiation counting device 59 thereby permitting air pressure to be applied to a suitable double-acting air cylinder 61 which is operative to drive suitable linkage to open respective drain valves 62 at a lower portion of each of the accumulators or storage containers 57. The cleaned solids are then flushed from the accumulators or storage containers 57 for disposal.

The liquid portion of the slurry delivered to the separator containers 56 is returned to the clarifier tank 31 through a suitable overflow header 63 for reuse and for maintaining a selected quantity of liquid within the tank 31. The solids disposal and liquid return phase of the operation of the clarifier requires a period in the nature of from fifteen to twenty minutes.

Heating the mixture within the lower chamber 37 has been found to be particularly effective in accelerating the reaction of the surfactant particularly when the temperature of the mixture is maintained within a selected range, therefore, a plurality of immersion heaters 64 are spaced around the side wall 32 and have the heating element portion thereof extending into the lower chamber 37. The immersion heaters 64 are suitably thermostatically controlled to maintain the temperature of the liquid within the lower chamber 37 within a selected range thereby accelerating the chemical reaction of the surfactant with the oil of the coating on the oil coated solids. In the illustrated structure, a suitable conduit 65 extends through the lower chamber 37 and may be used in conjunction with suitable engines operating adjacent equipment to allow the exhaust gases therefrom to pass through the conduit 65 and impart additional heat to the mixture within the lower chamber 37.

An upper surface of the liquid within the clarifier tank 31 must be maintained above the baffle 35 to permit the liquid above the baffle 35 to remain substantially quiescent whereby oil is permitted to form an oil phase on an upper surface of the liquid for removal. Whenever the liquid level drops below the float, the float controlled switch 39 is activated to divert gas or air through a suitable double-acting pneumatic cylinder 66 operatively connected to the control valve 40 which is preferably of the butterfly type thereby allowing make-up water to enter the clarifier tank 31 through the conduit 41. As the fluid and liquid level rises, the float also rises to its uppermost position thereby reversing the control valve 40 and the pneumatic cylinder 66 thereby interrupting the flow of make-up water into the clarifier tank 31.

The chemical injection pump 49 is preferably of the diaphragm-operated positive displacement plunger type which is adjustable as to length of stroke. The amount of air or gas pressure admitted to the diaphragm is controlled by an integral regulator to thereby determine the speed of the plunger in strokes per minute and thereby controlling the volume of the chemical surfactant pumped into the lower chamber 37 by the length of time the solenoid valve 48 admits air or gas to the diaphragm. The control box 47 has means therein to permit the duration of operation of the solenoid valve 48 to be adjustable.

The apparatus disclosed in FIGS. 2 and 3 is substantially automatic and is adapted for substantially continuous operation as compared to the batch type operation of the apparatus schematically disclosed in FIG. 1.

Operation of the apparatus disclosed in FIGS. 2 and 3 includes depositing a mixture of oil and solids coated with oil into the lower chamber 37 of the clarifier tank 31 and into the selected liquid therein. A chemical surfactant is injected into the mixture of oil and solids coated with oil and liquid effect separation of the oil coating from the solids. The mixture of oil and solids coated with oil and liquid is agitated by the mixing blades 52 to thoroughly disburse the chemical surfactant throughout the mixture and the baffle 35 separates the mixture into a quiescent zone in the upper chamber 36 and an agitated zone in the lower chamber 37. An upper surface of the liquid portion of the mixture of oil and solids coated with oil and liquid is maintained at a selected level above the baffle 35 by operation of the float controlled switch 39 and the control valve 40 which effects addition of make-up water into the clarifier tank 31 as needed. Agitation of the mixture of oil and solids coated with oil and liquid is then discontinued to retain the mixture within the container or tank 31 to permit settling of the solids portion and rising of the oil portion including the oil from the coating of the solids to an upper surface of the liquid portion of the mixture within the supper chamber 36. The oil portion is then removed from the upper surface of the upper chamber 36 by operation of either the gravity flow line 42 or the fluid transfer pump 43 upon activation of the probe 44. A slurry is formed of the settled and cleaned solids and liquid and is removed from the lower portion of the lower chamber 37. The removed slurry is then separated into a solids portion which is discharged from the accumulators or storage containers 57 upon signal from the radiation counting device 59 and a liquid portion which is returned to the lower chamber 37 of the clarifier tank 31. The mixture of oil and solids coated with oil and liquid may be heated to accelerate the chemical reaction of the surfactant with the mixture of oil and solids coated with oil and it is preferable to maintain the mixture of oil and solids coated with oil and liquid at a temperature within a selected range.

It is to be understood that while we have illustrated and described certain forms of our invention, it is not to be limited to the specific forms or arrangement of parts hereindescribed and shown.

What we claim and desire to secure by Letters Patent is:

1. A solids clarifier comprising:
   (a) a tank having a side wall and upper and lower end walls for containing a quantity of a selected liquid therein;
   (b) a baffle within said tank and positioned intermediate the upper and lower end walls and defining an upper chamber between said baffle and the upper end wall and a lower chamber between said baffle and the lower end wall;
   (c) means communicating with said tank and operative for delivering a mixture of fluids and solids to the lower chamber of said tank for mixing with the selected liquid;
   (d) chemical injection means communicating with said tank for injecting a selected chemical into the lower chamber and the mixture of the selected liquid and the fluids and solids therein;

(e) agitation means within the lower chamber of said tank to disperse the selected chemical throughout the mixture of the selected liquid and the fluids and solids to effect settling of the solids and rising of liquids of the mixture into the upper chamber;

(f) means communicating with said tank and responsive to a liquid level within the upper chamber for maintaining the liquid level within selected limits;

(g) means communicating with the upper chamber for selectively removing a desired liquid therefrom, said desired liquid separating from said selected liquid and floating thereon; and (h) means communicating with the lower chamber for selectively removing a solids-liquid slurry therefrom.

2. A solids clarifier as set forth in claim 1 wherein said means for removing the desired liquid from the upper chamber includes:

(a) a collection compartment within said upper chamber and having a bottom wall spaced above said baffle and a side wall extending upwardly from the bottom wall;

(b) a weir on an upper edge of the side wall for flow of the desired liquid from the upper chamber into said collection compartment; and (c) means in communication with said collection compartment and responsive to level of the desired liquid therein to remove the desired liquid therefrom.

3. A solids clarifier as set forth in claim 1 wherein said agitation means includes:

(a) a plurality of spaced mixing blades within the lower chamber;

(b) means operatively connected to each of said mixing blades for selectively driving same;

(c) elongated tubular means in a lower portion of the lower chamber and having a plurality of apertures spaced therealong; and (d) means operatively connected to said tubular means for effecting a flow of gas through the apertures and into the mixture of the selected liquid and the fluids and solids to maintain the solids in suspension.

4. A solids clarifier as set forth in claim 1 including:

(a) means within the lower chamber for heating the mixture of the selected liquid and the fluids and solids to accelerate the reaction of the selected chemical; and (b) means operatively connected to said heating means for controlling the temperature of the mixture of the selected liquid and the fluids and solids and maintaining the temperature within a selected range.

5. A solids clarifier as set forth in claim 1 including:

(a) a container spaced from said tank;

(b) means communicating with said container for delivering oil well production containing oil and solids coated with oil to said container;

(c) means in said container for centrifugally separating the solids coated with oil portion from the oil portion of the oil well production;

(d) a second container spaced from said first named container and positioned to receive the separated solids coated with oil portion of the oil well production for storage of same therein; and (e) means operatively connected to said second container for flushing same and delivering a mixture of oil and solids coated with oil to said means for delivery of the mixture of fluids and solids to said tank.

6. A solids clarifier as set forth in claim 1 including:

(a) means receiving the solids-liquid slurry and centrifugally separating the solids portion from the liquid portion of the slurry;

(b) means in communication with said separating means for receiving the separated solids portion therefrom for storage of same;

(c) means responsive to volume of solids in said receiving and storage means and operative to discharge the solids therefrom; and (d) means in communication with said separating means for effecting return of the separated liquid portion to said tank.

7. A solids clarifier as set forth in claim 6 wherein said volume responsive means comprises:

(a) a source of radiation directed toward said storage means;

(b) radiation counting means spaced from said radiation source and having said storage means therebetween; and (c) means operatively connecting said radiation counting means to said solids discharging means for activating same when a selected volume of the solids portion of the slurry has accumulated within said storage means.

8. A solids clarifier as set forth in claim 1 including:

(a) means in a lower portion of the lower chamber of said tank for maintaining the settled solids portion of the mixture of the selected liquid and the fluids and solids in suspension in said lower chamber to form the solids-liquid slurry;

(b) means receiving the solids-liquid slurry and centrifugally separating the solids portion from the liquid portion of the slurry;

(c) means in communication with said separating means for receiving the separated solids portion therefrom for storage of same;

(d) means responsive to volume of solids in said receiving and storage means and operative to discharge the solids therefrom; and (e) means in communication with said separating means for effecting return of the separated liquid portion to said tank.

9. A solids clarifier comprising:

(a) a tank having a side wall and upper and lower end walls;

(b) a baffle within said tank and positioned intermediate the upper and lower end walls and defining an upper chamber between said baffle and the upper end wall and a lower chamber between said baffle and the lower end wall;

(c) means communicating with said tank for delivering a portion of oil well production comprising a mixture of oil and solids coated with oil to the lower chamber of said tank;

(d) means communicating with said tank for delivering a selected liquid thereto;

(e) chemical injection means communicating with said tank for injecting a surfactant into the lower chamber and into the mixture of oil and solids coated with oil and the selected liquid;

(f) agitation means within the lower chamber of said tank to disperse the surfactant throughout the mixture of oil and solids coated with oil and the selected liquid to effect settling of the solids and rising of the oil and the oil of the coating of the solids into the upper chamber and through the selected liquid;

(g) means communicating with said tank and responsive to a liquid level within the upper chamber for maintaining the liquid level within selected limits by addition of a quantity of the selected liquid;

(h) means communicating with the upper chamber for selectively removing oil from an upper surface of the liquid therein;

(i) means communicating with the lower chamber for selectively removing a solids-liquid slurry therefrom and centrifugally separating the solids portion from the liquid portion of the slurry;

(j) means in communication with said separating means for receiving the separated solids portion therefrom for storage of same;

(k) means responsive to volume of solids in said receiving and storage means and operative to discharge the solids therefrom; and (l) means in communication with said separating means for effecting return of the separated liquid portion of the slurry to said tank.

10. A solids clarifier as set forth in claim 9 wherein:

(a) said means for removing oil from an upper surface of the liquid comprises a collection compartment within said upper chamber and having a bottom wall spaced above said baffle and a side wall extending upwardly from the bottom wall and having a weir on an upper edge of the side wall for flow of the oil from the upper chamber into said collection compartment and means in communication with said collection compartment and responsive to level of oil therein to selectively remove oil therefrom; and (b) said agitation means includes a plurality of spaced mixing blades within the lower chamber and means operatively connected to each of said mixing blades for selectively driving same and elongated tubular means in a lower portion of the lower chamber and having a plurality of apertures spaced therealong and operatively connected to said tubular means for effecting a flow of gas through the apertures and into the mixture of oil and solids coated with oil and the selected liquid to maintain the solids in suspension thereby forming the solids-liquid slurry.

11. A method of cleaning solids and removing oil therefrom, the method comprising:

(a) depositing a mixture of oil and solids coated with oil into a container having a selected liquid therein;

(b) injecting a surfactant into a mixture of oil and solids coated with oil and liquid to effect separation of the oil coating from the solids;

(c) agitating the mixture of oil and solids coated with oil and liquid;

(d) baffling the agitated mixture to separate same into a quiescent zone and an agitated zone;

(e) maintaining an upper surface of the liquid portions of the mixture of oil and solids coated with oil and liquid at a selected level;

(f) discontinuing agitation of the mixture of oil and solids coated with oil and liquid and retaining same within the container to permit settling of the solids portion and rising of the oil portion to the upper surface of the liquid portions of the mixture;

(g) removing the oil portion from the upper surface of the liquid portions of the mixture;

(h) removing a slurry formed of the settled solids and liquid from the container;

(i) separating the slurry into a solids portion and a liquid portion;

(j) returning the liquid portion of the slurry to the container; and (k) discharging the solids portion of the slurry.

12. A method of cleaning solids and removing oil as set forth in claim 11 wherein said agitating the mixture of oil and solids coated with oil and liquid includes:

(a) moving a plurality of mixing blades within the container; and (b) directing a flow of gas into the mixture of oil and solids coated with oil and liquid.

13. A method of cleaning solids and removing oil as set forth in claim 11 including:

(a) heating the mixture of oil and solids coated with oil and liquid to accelerate the chemical reaction of the surfactant with the mixture of oil and solids coated with oil; and (b) maintaining the mixture of oil and solids coated with oil and liquid at a temperature within a selected range.

14. A method of cleaning solids and removing oil as set forth in claim 11 wherein:

(a) separating the slurry formed of the settled solids and liquid includes centrifugally removing the solids portion from the liquid portion and moving the solids portion into an accumulator; and (b) discharging the solids portion of the slurry includes detecting a level of the solids portion in the accumulator to activate controls for flushing the solids portion from the accumulator.

15. A method of cleaning solids and removing oil as set forth in claim 11 wherein depositing the mixture of oil and solids into the container includes:

(a) flowing oil well production containing oil and solids coated with oil into a container;

(b) centrifugally removing the solids coated with oil from the oil of the oil well production and moving the solids coated with oil into an accumulator; and (c) flushing the solids coated with oil from the accumulator for flowing of same to the container having the selected liquid therein.

References Cited

UNITED STATES PATENTS

| | | | |
|---|---|---|---|
| 3,105,751 | 10/1963 | Powell | 55—176 X |
| 3,017,342 | 1/1962 | Bvlat et al. | 210—21 X |
| 3,376,977 | 4/1968 | Gordon et al. | 55—271 X |
| 3,410,794 | 11/1968 | Li | 55—45 X |

MICHAEL ROGERS, Primary Examiner

U.S. Cl. X.R.

55—45, 171; 210—73, 104, 195, 202